Nov. 20, 1928.

E. C. STEERE 1,691,943

ELECTRICAL WATER HEATER

Filed March 10, 1926

INVENTOR
ERNEST CHARLES STEERE
BY
ATTORNEYS.

Patented Nov. 20, 1928.

1,691,943

UNITED STATES PATENT OFFICE.

ERNEST CHARLES STEERE, OF SYDNEY, NEW SOUTH WALES, AUSTRALIA.

ELECTRICAL WATER HEATER.

Application filed March 10, 1926, Serial No. 93,550, and in Australia March 19, 1925.

This invention relates to continuous or intermittent electric water heaters such as bath heaters, hot water reservoirs, urns, egg boilers, kettles, and other domestic apparatus for using or containing hot water.

My invention comprises an electrically insulating water container formed of porcelain or similar material, a heating element suspended from an inner lid in the container, extended water inlet and outlet passages formed in and of the material of the container so that high electrical resistances are established between the live water in the container and the inlet and outlet ports, and insulated supply and delivery pipes on the ports.

In the accompanying drawings which illustrate the invention in the form of a bath heater:—

Figures 1, 2, 3, 4:
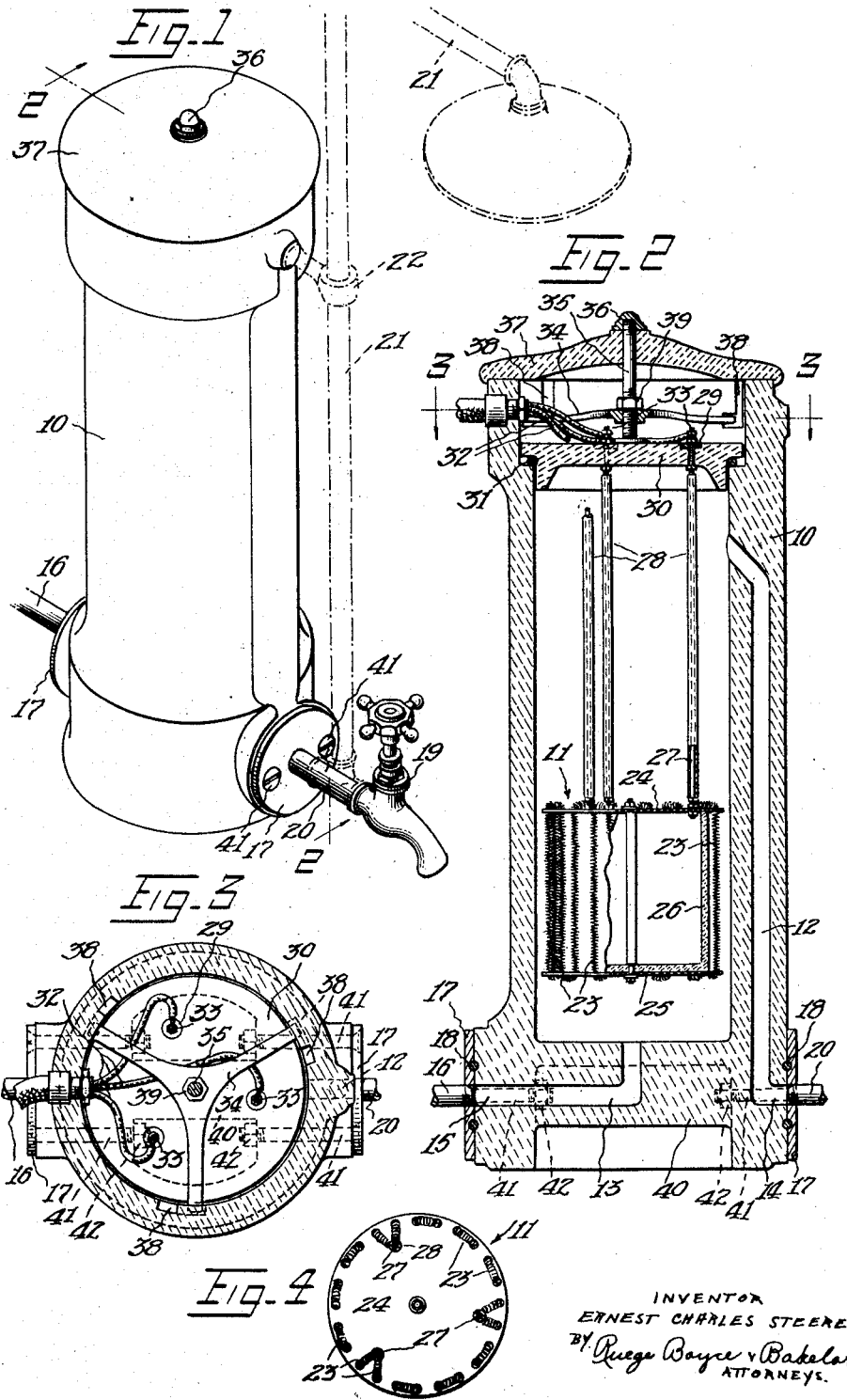
Fig. 1 is a perspective view showing a shower connection in dotted lines.
Fig. 2 is a vertical sectional elevation on the line 2—2 of Fig. 1.
Fig. 3 is a plan section on the line 3—3 of Fig. 2.
Fig. 4 is a plan of a heating element.

A water container 10 formed of electrically insulating material is fitted with a removable heating element 11, and an extended water outlet passage 12 and an extended water inlet passage 13 are formed in the body of the container to interpose high electric resistances between the live water in the container and the ports 14, 15.

An inlet supply pipe 16 is connected with port 15 by means of a detachable metal plate 17 which is threaded centrally and is fitted with a water-tight and electrically insulating gasket 18; a delivery cock 19 is provided on a delivery pipe 20 which is connected with the port 14 in similar manner to pipe 16 with port 15. A shower connection 21 may be fitted on pipe 20 and is supported by a casting 22.

The heating element 11 consists of resistance wire 23 threaded through holes or notches in extended flange portions of electrically insulating plates 24, 25 which are detachably mounted on the top and bottom of an open ended insulating casing 26. Leads 27 are enclosed in loosely mounted non-conducting tubes 28, and, passing through water-tight gaskets 29, are mounted on an inner lid 30 which is seated on a water-tight gasket 31.

Leading in wires 32 pass through an aperture in the container and are connected with terminals 33 on the ends of the leads 27.

The arms of a centrally threaded triple armed plate 34, which is mounted by means of a bolt 35 and nut 36 on an outer removable cover plate 37, are adapted to enter bayonet slots 38 in the wall of the container and may be locked in position by tightening the lock nut 39, This nut may form portion of the bolt 35.

A double cavity is formed in the lower face of the base of the container leaving a central web or partition in which the inlet passage 13 is formed. The plate 17 and the corresponding plate on port 14 are secured to the container by bolts 41—41 and nuts 42—42.

I claim:—

1. An electric water heater comprising a water container formed of electrically insulating material, an extended water outlet passage formed in and of the material of the container, an inner lid in the container, a removable cover plate for the container, a plate mounted on the cover plate, arms on the plate, bayonet slots in the container wall to receive the ends of the arms, a locking bolt carried by the cover plate and threaded through the armed plate, and a removable heating element suspended from said inner lid.

2. An electric water heater comprising a water container formed of electrically insulating material, an extended water outlet passage formed in and of the material of the container, cavities in the base of the container, a web separating said cavities from each other, an extended water inlet passage formed in the web, bolts passing through the material of the container into said cavities, metal plates on the outer ends of the bolts, nuts on the inner ends of said bolts, an insulating and water-tight gasket mounted between each of said plates and the container, an inner lid in the container, and a removable heating element suspended from said inner lid.

3. An electric water heating unit comprising an electrically insulating casing, top and bottom non-conducting plates on the casing, a resistance wire wound on said plates outside of said casing, and leads from said wire and adapted to form suspension means for the unit.

4. An electric water heater comprising a water container formed of electrically insulating material, extended water inlet and water outlet passages formed in and of the material of the container, an inner lid in the container, a water-tight seating for said inner lid, water-tight gaskets mounted in the inner lid, leads passing through said gaskets in the lid, electric terminals on the upper ends of said leads, leading in wires secured to said terminals, and a removable heating element flexibly suspended by said leads from said inner lid and exposed to direct contact with the contents of the container.

In testimony whereof I have signed my name to this specification.

ERNEST CHARLES STEERE.